United States Patent [19]
Palisin, Jr.

[11] Patent Number: 4,909,393
[45] Date of Patent: Mar. 20, 1990

[54] CONTAINER RECONFIGURING SYSTEM

[75] Inventor: Stephen P. Palisin, Jr., South Euclid, Ohio

[73] Assignee: Berwick Container Corp., South Euclid, Ohio

[21] Appl. No.: 271,157

[22] Filed: Nov. 14, 1988

[51] Int. Cl.⁴ .................................................. B65D 1/16
[52] U.S. Cl. ....................................... 206/519; 220/83; 72/349; 413/69
[58] Field of Search .................. 72/343, 347, 350–352, 72/354, 358, 361, 369, 370, 379; 206/519, 520; 220/72, 83; 413/1, 69, 78

[56] References Cited

U.S. PATENT DOCUMENTS

| | | | |
|---|---|---|---|
| D. 97,580 | 11/1935 | Ingersoll | D34/39 |
| D. 122,336 | 9/1940 | James | D9/325 |
| D. 183,541 | 9/1958 | Plochman, Jr. | D58/8 |
| D. 220,612 | 5/1971 | Siegler | D9/7 |
| D. 228,489 | 10/1973 | Mascia | D9/3 |
| D. 237,251 | 10/1975 | Plummer | D9/1 |
| 685,832 | 11/1901 | Gender | 220/72 |
| 1,345,594 | 7/1920 | Grob | 72/347 |
| 1,446,158 | 2/1923 | Clymer et al. | |
| 1,527,897 | 2/1925 | Mittinger | |
| 1,746,869 | 2/1930 | Rosenthal | |
| 2,406,380 | 8/1946 | Johnston, Jr. | 220/72 |
| 2,423,708 | 7/1947 | Keogh et al. | 113/120 |
| 2,832,496 | 4/1958 | Williams | 220/5 |
| 2,943,386 | 7/1960 | Katz | 29/401 |
| 3,344,646 | 10/1967 | Moller | 72/348 |
| 3,419,176 | 12/1968 | Lipfert et al. | 220/23.4 |
| 3,425,382 | 2/1969 | Johnson | 113/120 |
| 3,461,699 | 8/1969 | Roth | 72/56 |
| 3,659,741 | 5/1972 | Corelli | 220/72 |
| 3,759,416 | 9/1973 | Constantine | 220/72 |
| 3,786,667 | 1/1974 | Garnett, Jr. | 72/348 |
| 3,811,393 | 5/1974 | Close | 113/120 |
| 3,910,414 | 10/1975 | McCay | 206/515 |
| 3,940,008 | 2/1976 | Flanders | 220/5 |
| 3,942,670 | 3/1976 | Mingus et al. | 220/23.4 |
| 3,949,877 | 4/1976 | Santoni | 206/519 |
| 4,040,372 | 8/1977 | Flanders | 113/120 |
| 4,366,696 | 1/1983 | Durgin et al. | 72/339 |
| 4,416,374 | 11/1983 | Smith et al. | 206/507 |
| 4,512,700 | 4/1985 | Santoni | 413/4 |
| 4,597,502 | 7/1986 | Troughton | 220/67 |
| 4,648,522 | 3/1987 | Wise | 220/5 |
| 4,723,681 | 2/1988 | Glerum | 220/72 |

FOREIGN PATENT DOCUMENTS

| | | | |
|---|---|---|---|
| 0136632 | 3/1948 | Australia | 220/72 |
| 1265282 | 5/1961 | France | 72/358 |
| 2431962 | 6/1979 | France | |
| 0754549 | 8/1956 | United Kingdom | 220/72 |

Primary Examiner—Jimmy G. Foster
Attorney, Agent, or Firm—David A. Burge

[57] ABSTRACT

A system for reconfiguring generally cylindrical, open-top containers that are formed from deformable metal utilizes a press to force bottom portions of a container into a die to carry out a drawing operation that alters bottom and side wall portions of the containers to elongate the containers and to provide the containers with tapered, fluted side portions that enable the reconfigured containers to be nested for empty shipment and storage in a minimum of space. As containers are reconfigured, the decrease that results in fluid-carrying capacity as side wall portions are fluted and folded inwardly is compensated for, at least in large part, by elongating the containers as by folding peripheral portions of their bottom walls upwardly to serve as extensions of their side walls. Containers such as industrial drums formed from steel and having rolled seams or the like which extend circumferentially about their bottom walls to join the bottom walls with the side walls are reconfigurable utilizing the system of this invention, and the reconfiguration preferably is effected without distorting the rims of the drums, and without causing a loss in fluid-carrying integrity or capacity. The system of the invention is advantageously utilized to effect reconfiguration of reusable industrial drums to at least double the empty drum containing capacity of valuable transportation and storage space.

33 Claims, 8 Drawing Sheets

CONTAINER RECONFIGURING SYSTEM

CROSS-REFERENCE TO RELATED APPLICATIONS

Reference is made to a pair of companion design application filed Nov. 14, 1988, Ser. No. 270,123, entitled NESTABLE CONTAINER WITH SEAMED, FLUTED SIDE WALL, and Ser. No. 270,122, entitled NESTABLE CONTAINER LINER, the disclosures of which are incorporated herein by reference.

Background of the Invention

1. Field of the Invention

The present invention relates to a system for reconfiguring generally cylindrical, open-top containers that are formed from deformable metal, to elongate the containers and to provide the containers with tapered, fluted side portions that enable the reconfigured containers to be nested for empty shipment and storage of a maximum number of containers in a minimum of space. Other aspects of the invention relate to features of the nestable containers that are produced through use of the system of the invention, and to the utilization of these nestable containers to maximize the container carrying capacity of valuable cartage and storage space.

2. Prior Art

Open-top containers are well known that are of generally cylindrical shape and have circular bottom walls that are connected along circumferentially extending seams to upstanding, generally cylindrical side walls. Examples include containers that range in character from small "tin cans" of the type that are used to contain household foodstuffs, to relatively large steel drums that are utilized in industry. While the present invention is discussed principally in conjunction with its applicability to relatively large, open-top, steel drums of the type that are reused repeatedly in industry, it will be understood by those skilled in the art that features of the invention are not limited in their application to use with industrial drums that are formed from steel. Likewise, while the present invention is discussed principally in conjunction with its applicability to the reconfiguring of containers such as industrial drums, many of which already have seen service in industry, it will be understood by those skilled in the art that features of the invention are not limited in their application to use with "used" containers such as industrial drums, but rather can be employed quite advantageously in conjunction with the formation of nestable new containers.

Because the cost of cleaning or otherwise reconditioning open-top containers such as steel drums to enable the drums to be reused is a mere fraction of the cost of manufacturing replacement drums, it has become a widely accepted practice in industry to repeatedly reuse steel drums. Used and reconditioned drums are not only available for purchase but have come to comprise commodities having such value that large storage spaces in warehouses often are devoted to the empty storage of reusable drums. Likewise, in view of the relatively low cost that is associated with reusing existing steel drums—as compared to the much higher relatively cost that is associated with purchasing new drums for one-time use—it has become quite commonplace for relatively large volumes of expensive interstate cartage space to be utilized for the transport of empty drums to sites where the drums are to be reused.

A problem with the empty storage and empty shipment of open-top containers of standard size such as steel drums is that the generally cylindrical shape of these containers prohibits the containers from being even partially nested one within another to permit the empty containers to be stacked or otherwise grouped to make efficient use of the space that they occupy. Each container of standard size that is added to a storage space in a warehouse, or to a transport space in a semitrailer truck or a railroad boxcar, does nothing to make any use whatsoever of the empty space that is defined within such other containers as already occupy the storage or transport space.

SUMMARY OF THE INVENTION

The present invention addresses the foregoing and other drawbacks of the prior art.

One aspect of the present invention relates to the provision of a system for reconfiguring generally cylindrical, open-top containers that are formed from deformable metal, to provide the reconfigured containers with features that enable the reconfigured containers to be nested so that empty space within the interior of one container of standard size can be occupied, at least in part, by portions of an adjacent container of the same standard size. Features that are added to the containers during the reconfiguration process include tapered, fluted side portions that extend along a majority of the length of the sides of the reconfigured containers, and bottom wall portions that are repositioned so as to give the reconfigured containers enhanced height (i.e., the containers are elongated during reconfiguration).

In accordance with one aspect of the preferred practice of the present invention, the value of new and used open-top, generally cylindrical containers formed from deformable metal is enhanced by reconfiguring the containers through a process that causes elongation of the containers, and that causes flute formations to be added to the side walls. The features that are added during reconfiguration permit the containers to be nested for empty storage and cartage. Preferably these features are added (1) without causing a change to any significant degree in the fluid-carrying capacity, (2) without disturbing the fluid-tight character of seams that were formed when the containers were originally fabricated, and (3) without distorting rim portions of the containers.

A significant aspect of the preferred practice of the present invention resides in the capability that is provided to carry out the aforedescribed container reconfiguration process without causing the rims that surround the open end regions of the containers to be distorted so as to be out-of-round, and without altering the dimensions of the rims. Indeed, in preferred practice, the process of the present invention is carried out in a way that causes rim portions of a container that is undergoing reconfiguration to be restrained so as to counteract forces that otherwise might cause changes in rim shape and size. Thus, in preferred practice, only bottom wall and side wall portions that are spaced from the open upper end region of an open-top container are reconfigured, and such force as is applied to a container to effect its reconfiguration is applied by a ram that operates on the container's bottom wall, and by portions of a die that cause deformations at locations that are spaced from the rim, thereby enabling conventional closures (such as lids of a standard size that are designed to be removably attached to the rim of a container to close the open end region of the container) to continue to be used with the container.

Another aspect of the invention resides in the shape that is defined by containers that are formed as the result of the reconfiguration process—a shape that is characterized by tapered flute formations that extend along the majority of the length of the sides of the reconfigured containers, by a bottom wall that has central portions thereof moved axially relative to the side wall so as to give the reconfigured containers increased height, and by peripheral bottom wall portions that are folded and drawn (1) to define a smaller diameter bottom, and (2) to form transition surfaces between the bottom and the fluted side formations of the reconfigured containers.

Still another aspect of the invention resides in utilizing nestable containers that have the aforedescribed configuration to maximize the container carrying capacity of cartage and storage space, and to enhance the ease and efficiency with which empty, reusable containers can be handled, stored and transported.

A feature of the system of the present invention resides in an unexpected result, namely a determination that the type of container reconfiguration that is carried out can in fact be utilized with seamed containers of the type that have circular bottom walls that are joined along a circumferentially extending seam to the lower end region of an upwardly extending, generally cylindrical side wall. Because steel drums typically have a rolled bottom wall seam where the bottom wall is joined with a surrounding side wall, and because seamed structures of this type are ordinarily thought of as being incapable of being put through a significant amount of deformation, those skilled in the art have not viewed existing steel drums as being reconfigurable. Especially where, as here, reconfiguration involves extensive deformation of container portions adjacent to the seam and/or defining the seam itself, those skilled in the art have considered what is achieved with this invention as residing considerably outside the range of accepted, conventional practice.

A feature of the invention resides in the fact that the reconfiguration system not only can be used with containers having seamed-wall construction, but that, in fact, the reconfiguration system is found to be quite reliably usable with containers such as industrial drums that have rolled seams and the like that extend circumferentially about their bottom walls to join the bottom walls with the side walls. During the reconfiguration process, the bottom rim seam (i.e., the seam that connects the sheet of metal that defines the bottom wall with the seamed roll of sheet metal that defines the side wall) of a container is deformed in such a way that it forms part of a fluted side wall of the reconfigured container. The seam is not unfolded or unlocked or otherwise violated during the reconfiguration process, and the fluid-tight integrity of the seam is preserved.

BRIEF DESCRIPTION OF THE DRAWINGS

These and other features, and a fuller understanding of the invention may be had by referring to the following description and claims taken in conjunction with the accompanying drawings, wherein:

DESCRIPTION OF THE PREFERRED EMBODIMENT

Figure 1:
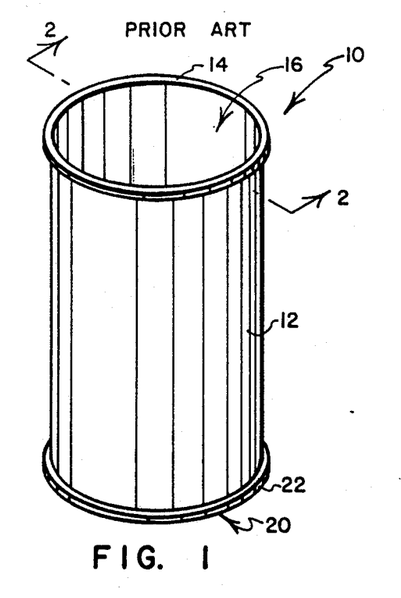
FIG. 1 is a perspective view of an open-top, generally cylindrical container of a type that is well known in the prior art.
Figure 2:
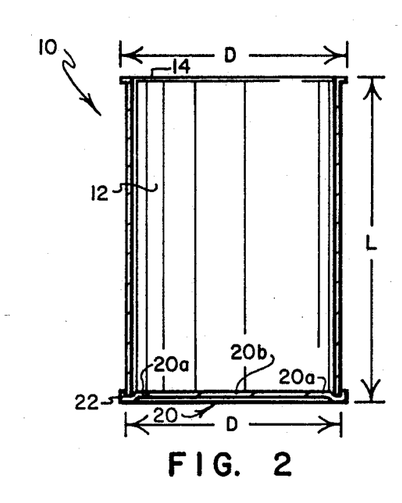
FIG. 2 is sectional view thereof as seen from a plane indicated by a line 2—2 in FIG. 1.

Referring to FIGS. 1 and 2, a conventional, open-top, generally cylindrical container such as a metal drum is indicated generally by the numeral 10. The drum or container 10 has an upstanding, generally cylindrical side wall 12 that is of substantially uniform diameter. The upper end of the side wall 12 has a rolled rim 14 that defines an upwardly-facing opening 16 for admitting contents into the container 10. A circular, substantially planar bottom wall 20 closes the bottom end of the side wall 12, and is connected to the side wall 12 by a perimetrically extending seam 22, typically a rolled seam.

While the bottom wall 20 is formed from a single piece of metal sheet or plate stock that is of generally circular shape, selected portions of the bottom wall 20 are designated by different numerals. The numeral 20b designates a "central portion" of the bottom wall 20 (i.e., a central-most region of the bottom wall 20 that can be thought of as defining about ⅔ of the diameter of the drum 10). The numeral 20a designates "peripheral portions" of the bottom wall 20 (i.e., an annular band of material that defines the remainder of the bottom wall 20 and that extends circumferentially about the central portion 20b) that are joined to the side wall 12 by the seam 22.

Referring to FIG. 2, the container 10 has an overall length or height that is designated by the dimension L. The container 10 is of substantially uniform diameter along its length, and its diameter is designated by the dimension D. While features of the present invention are not limited in utility to applications that involve reusable industrial drums, for purposes of this discussion the container 10 will be assumed to comprise a standard, reusable industrial drum having a length L of about 34 inches, and a diameter D of about 24 inches.

Figure 3:
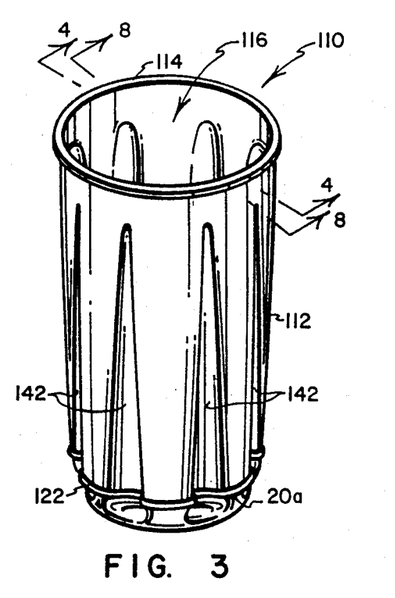
FIG. 3 is a perspective view of the container of FIG. 1 in a reconfigured form that embodies features of the present invention.
Figure 4:
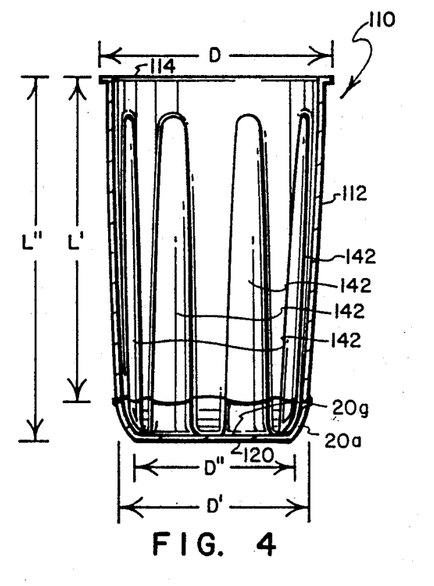
FIG. 4 is sectional view thereof as seen from a plane indicated by a line 4—4 in FIG. 3.
Figure 5:
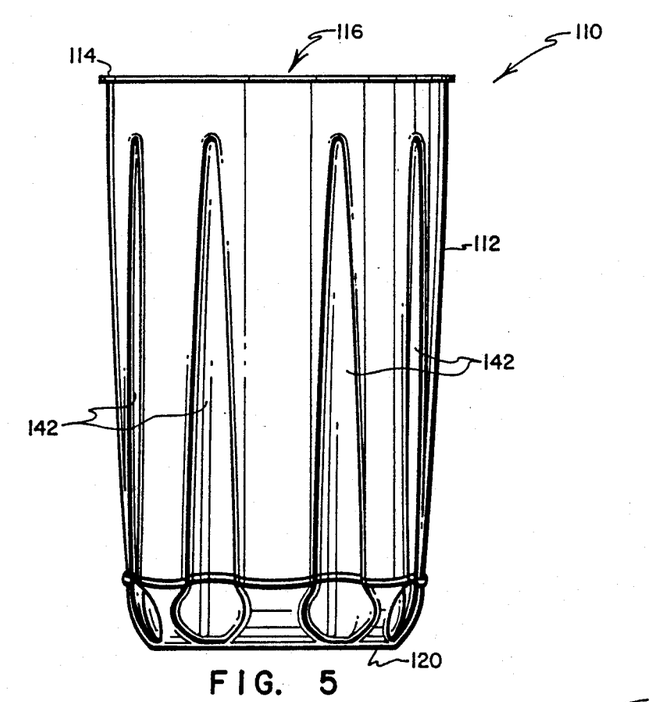
FIG. 5 is a side elevational view of the reconfigured container of FIG. 3.
Figure 6:
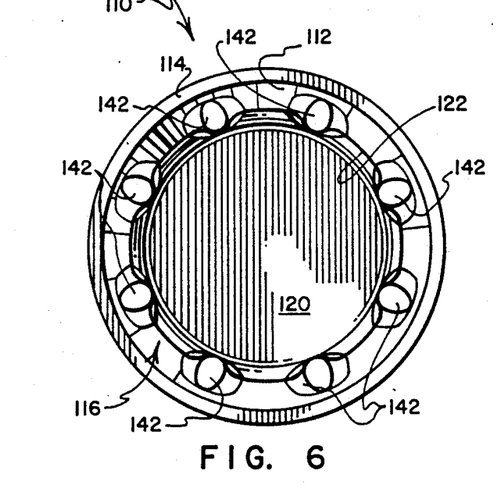
FIG. 6 is a top plan view thereof.
Figure 7:
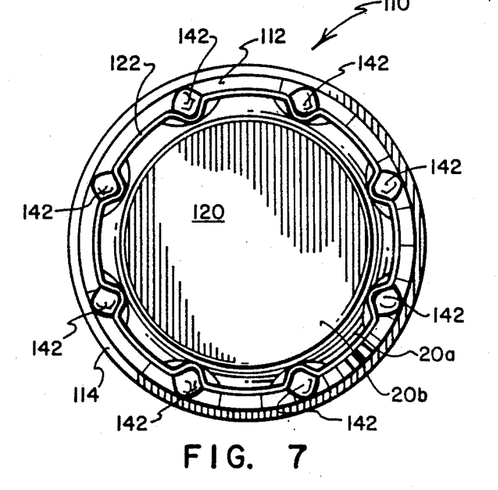
FIG. 7 is a bottom plan view thereof.
Figure 8:
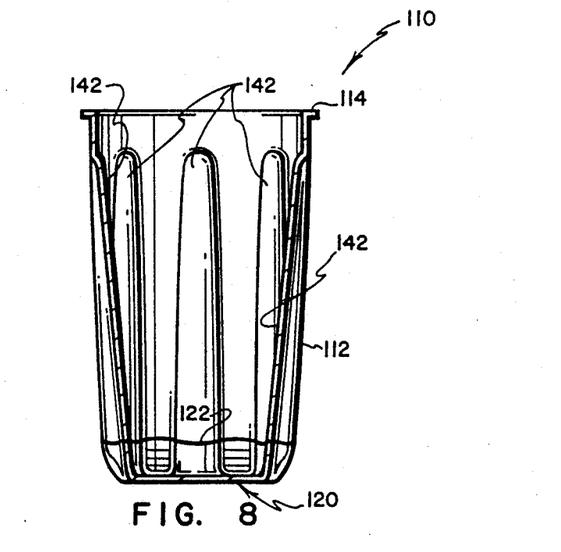
FIG. 8 is a sectional view as seen from a plane indicated by a line 8—8 in FIG. 3.

Referring to FIGS. 3 and 4, a container (of the type shown in FIGS. 1 and 2) that has been reconfigured in accordance with the preferred practice of the present invention is indicated generally by the numeral 110. The container 110 has an upstanding, generally cylindrical side wall 112 (portions of which are defined by the side wall 12 of the original container 10, and portions of which are defined by the aforementioned peripheral portions 20a of the bottom wall 20 of the original container 10). The upper end of the side wall 112 has a rolled rim 114 that is identical to the rim 14 and defines an upwardly-facing opening 116 that is identical to the opening 16 for admitting contents into the container 110. A circular bottom wall 120 is defined by central portions 20b of the original bottom wall 20. The reconfigured container 110 has a seam 122 that is of relatively complex configuration with portions thereof tracing an outline that snakes radially inwardly and outwardly along the side wall surface among tapered flute formations 142 that are provided therein (with the seam 122 also tending to snake axially in a waveform of relatively small amplitude, depending on the character of the forces that are generated during elongation of the container 10 and on the strain response that side wall portions of the container 10 exhibit during the reconfiguration process).

Referring to FIG. 4, the distance between the rim 114 and the seam 122 is designated in a general way by a dimension L' (which is substantially unchanged from the original dimension L). It will be understood, however, that in view of the complex configuration of the seam 122 (portions of which do not necessarily extend in a common plane with other portions thereof), the dimension that is designated by the letter L' is approximate in character and is intended to designate the general location of the seam 122 relative to the rim 114.

Referring still to FIG. 4, the container 110 has an overall length or height that is designated by the dimension L''. The container 110 is of non-uniform diameter along much of its length, with the diameter of the container 110 at locations within the vicinity of the rim 114 being designated by the dimension D (a dimension that is unchanged from what is depicted in FIG. 2), but with the maximum diameter of the container 110 within the vicinity of the seam 122 being designated by the dimension D', and with the diameter of the circular bottom wall 120 being designated by the dimension D''. When the container 110 is formed from an industrial drum having length and diameter dimensions L and D of about 34 inches and 24 inches, respectively, the resulting container 110 preferably has L'', D' and D'' dimensions of about 37½ inches, 21 inches and 17 inches, respectively.

Referring variously to FIGS. 3 through 8 wherein the elongated, fluted shape (and other features) of the reconfigured container 110 are illustrated, it will be seen that the flute formations 142 comprise a plurality of substantially identical, smoothly tapering formations that are characterized by surfaces that arc smoothly and relatively gently about the side wall 112 of the container 110. In preferred practice, the flute formations 142 are eight in number—with the flute formations 142 being arranged symmetrically in opposed pairs with respect to an imaginary center axis of the container 110. However, larger or smaller number of flute formations 142 can be utilized, as can flute formations (not shown) that are of larger and/or smaller dimensions than are the formations 142, and/or that are not identical one to another—as may be desired to accommodate various container types and shapes, and as may be desired in order to provide different degrees of taper along selected side wall portions.

As will be explained in greater detail, the reconfiguration of the container 10 to form the container 110 is carried out utilizing a press that operates on containers, one at a time, to force a closed bottom end region of each generally cylindrical container 10 into a die, and to carry out a drawing operation that alters bottom and side wall portions of the container 10 to elongate the container 10 during reconfiguration and to provide the reconfigured container 110 with tapered, fluted formations 142. The addition of the flute formations 142 and the elongation of the container as by providing a reconfigured end wall 120 are features that, taken in combination, enable identically reconfigured containers 110 to be nested quite efficiently for empty shipment and storage in a minimum of space.

Figure 9:
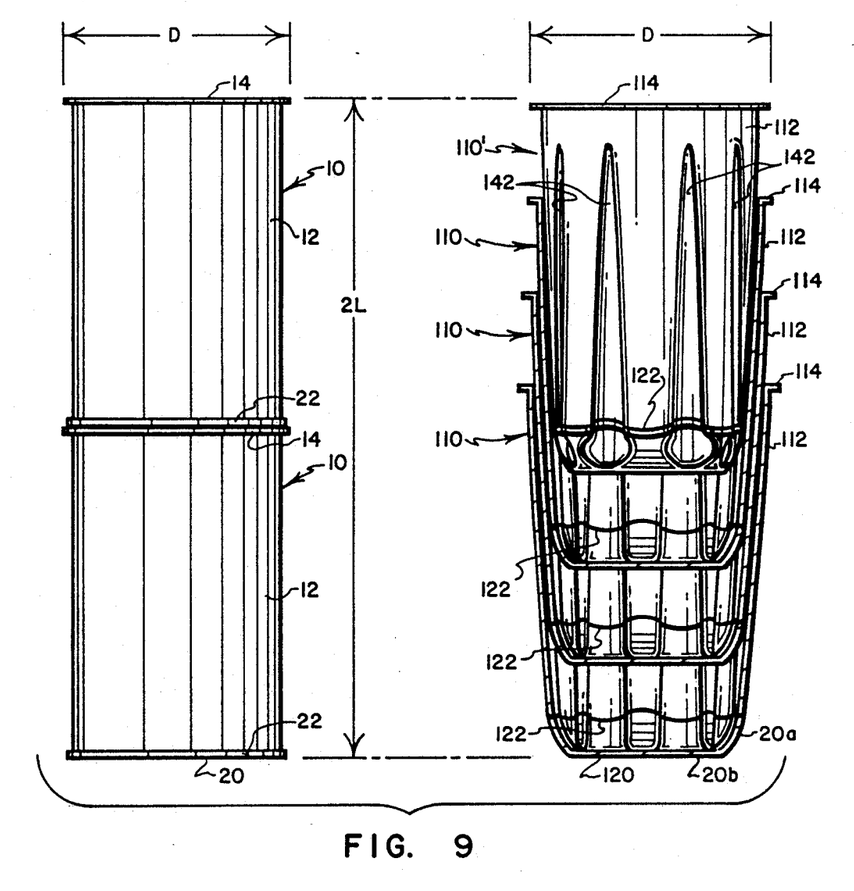
FIG. 9 is a somewhat schematic cross sectional view depicting an upstanding "nest" of four of the reconfigured containers, and showing how this nest of four reconfigured containers compares favorably in required storage space with a stack of two conventional containers of corresponding size.

Referring to FIG. 9, four of the reconfigured containers 110 are shown in nested relationship (i.e., with portions of three of the four containers 110 extending into adjacent underlying ones of the containers 110) so as to form a "nest" that is designated generally by the numeral 150. By nesting the reconfigured containers 110 in the way that is illustrated in FIG. 9, it is possible to significantly diminish the amount of storage and/or transport space that is required to house the containers 110 when empty. In fact, the effective capacity of a given storage or transportation space can be doubled, or more than doubled.

Doubling the container carrying capacity of expensive cartage space is not a matter of small import in its economic impact. In view of the many hundreds of semi-trailer trucks that daily travel the highways to haul nothing other than empty drums from locations where the drums were emptied and/or were stored to locations where the drums will be put back into service, the economic impact of being able to cut the number of these truck shipments by at least 50 percent is quite remarkable.

To better understand how the reconfigured containers 110 of the present invention can double or more than double the effective container-carrying capacity of a given shipping or storage space, one need only to compare the way in which empty containers 10 presently are stored with the way in which nested, reconfigured containers 110 (that embody features of the present invention) are stored. The resulting containers 110 can be nested one within another such that, for example (as is depicted in FIG. 9) a nest 150 of four drums 110 will occupy a floor footprint and a height that formerly was occupied by two conventional drums 10 stacked one atop the other. Likewise, a seven-drum nest (not shown) will occupy about the same floor footprint and height that formerly was consumed by three drums stacked one atop another.

An additional factor that enhances the ease and efficiency with which the reconfigured drums can be loaded into a given storage or transportation space is the fact that a nest of several drums forms a relatively solid structure that can be handled by equipment such as fork lift trucks and the like—far more easily than can an equal number of conventional drums that must be dealt with individually inasmuch as they are not interconnected. Thus, a nest of a dozen drums can be moved much more quickly and efficiently than a dozen drums can be moved individually.

Furthermore, inasmuch as the drums within a nest have wall portions that extend one inside the other, the drums that comprise a nest tend to reinforce each other during handling and storage, and therefore are significantly less likely to be dented, punctured or otherwise damaged while empty.

Still another factor that enhances efficiency through the use of the reconfigured drums of the present invention is that relatively large nests of drums (e.g., a nest of typically eighteen to twenty four drums) can be handled as one would handle a lengthy cylindrical object, with such nests of drums being stacked like corded wood. And, inasmuch as the number of drums that are nested together can be selected to correspond with the height (or length) of a particular storage or transportation space that is to be used to contain empty drums, drums can be loaded efficiently into the available space—i.e., far more efficiently than is possible with conventional drums.

A feature of the system of the present invention resides in an unexpected result, namely a determination that the type of container reconfiguration that is carried out in accordance herewith can in fact be utilized with conventional seamed containers of the type that have circular bottom walls that are joined along a circumferentially extending seam to the lower end region of an upwardly extending, generally cylindrical side wall, e.g., the container 10 that is shown in FIG. 1. Because steel drums typically have a rolled bottom wall seam (such as the seam 22) where the bottom wall is joined with a surrounding side wall, and because seamed structures of this type are ordinarily thought of as being incapable of being put through a significant amount of deformation, those skilled in the art have not viewed existing steel drums as being reconfigurable. Especially where, as here, reconfiguration involves extensive deformation of container portions adjacent to the seam and/or defining the seam itself, those skilled in the art have considered what is achieved with this invention as residing considerably outside the range of accepted, conventional practice.

A feature of the invention resides in the fact that the reconfiguration system not only can be used with containers having seamed-wall construction, but that, in fact, the reconfiguration system is found to be quite reliably useful with containers such as industrial drums that have rolled seams and the like that extend circumferentially about their bottom walls to join the bottom walls with the side walls. During the reconfiguration process, the bottom rim seam (i.e., the seam that connects the sheet of metal that defines the bottom wall with the seamed roll of sheet metal that defines the side wall) of a container is deformed in such a way that it forms part of a fluted side wall of the reconfigured container. While portions of the seam may be drawn out of a common plane so as to give the seam a highly complex shape that includes arc-shaped (if not S-shaped) curves when viewed in elevation, the seam is not unfolded or unlocked or otherwise violated during the reconfiguration process, and the fluid-tight integrity of the seam is preserved.

An aspect of the invention that derives from the discovery that bottom-seamed containers can be reconfigured with relative ease as by using the system of the present invention, is the provision by the present invention of a means for economically fabricating new, nestable containers that incorporate the advantageous features of the containers 110. Stated in another way, one of the features of the present invention is that it enables new, relatively complexly configured, nestable containers to be manufactured quite easily and inexpensively by (1) forming conventional cylindrical containers 10 from a coil of steel that is roll-seamed to a circular bottom plate, and (2) by subjecting these newly formed cylindrical containers to the aforedescribed draw-forming process to reconfigure the containers 10 to provide the complex shape and the nestable features of the containers 110.

A further feature of the preferred practice of the present invention that also provides an unexpected result is the finding that, as containers such as standard 55 gallon drums are reconfigured, the decrease in fluid-carrying capacity that results as side wall portions are fluted and folded inwardly is in large part compensated for by the container elongation that takes place as peripheral bottom wall portions are folded upwardly to serve as extensions of the side walls. In the most preferred practice of the invention, the container reconfiguration process is carried out such that the volume compensation that occurs in this way results in substantially no ultimate change in the fluid-carrying capacity of the drum.

With the preferred practice of the present invention, steel drums that typically measure about 24 inches in diameter and 34 inches in height are reconfigured such that central portions of their bottom walls are moved axially relative to portions of the side walls to elongate the drums by a matter of about 3 to 4 inches so as to elongate the drum by about ten percent; side wall and peripheral bottom wall portions (including such portions thereof as define seams between the bottom and side walls) are drawn radially inwardly to define tapered flutes (preferably an array of eight identical flutes, with each of the flutes extending upwardly along the majority of the lengths of the sides of the reconfigured containers so as to reduce the maximum diameter of bottom portions of the drums by about 2 to 3 inches (i.e., by about ten percent), and by providing a bottom wall that is diminished in diameter to about 17 to 18 inches (as compared with an original bottom wall diameter of about 24 inches); and, as a result of this deformation, the fluid-carrying volumes of the containers are not appreciably altered.

Referring to FIGS. 9-16, in preferred practice, container reconfiguration of the aforedescribed type is carried out as by utilizing an apparatus 200. The apparatus 200 includes an upstanding frame 210 that supports a hydraulic cylinder 220 having a downwardly extensible ram 230—with the cylinder 220 being located above a hollow die 240 that defines an upwardly opening cavity 250, and with the ram 230 being extensible downwardly into the cavity 250.

Figure 10:
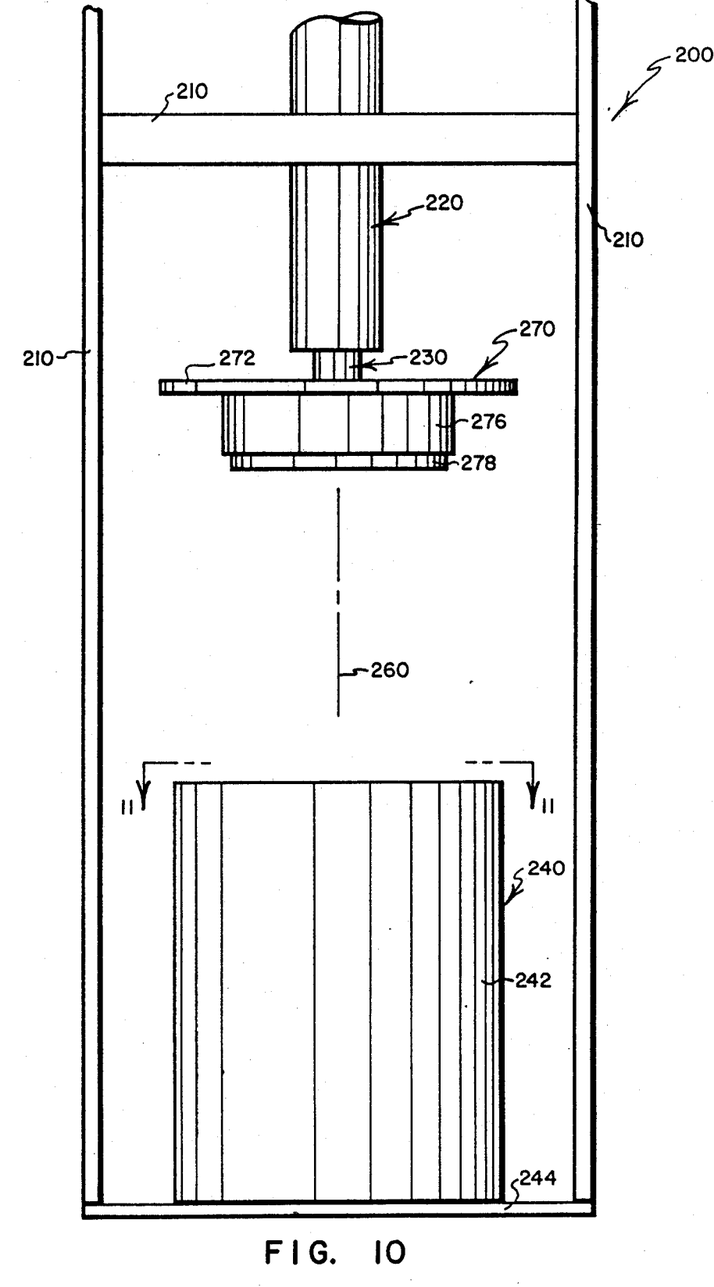
FIG. 10 is a somewhat schematic side elevational view of an apparatus that is utilized in accordance with the preferred practice of the present invention to effect reconfiguration of containers of the type shown in FIG. 1 to form containers of the type shown in FIG. 3, with the apparatus having its ram raised above a die into which containers are pressed by the ram, one at a time, to effect their reconfiguration.
Figure 11:
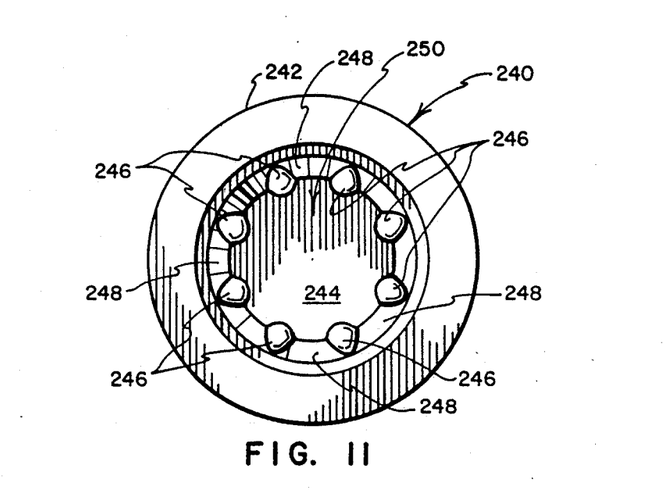
FIG. 11 is a top plan view as seen from a plane indicated by a line 11—11 in FIG. 10.

The hydraulic cylinder 220 is supported by the frame 210 so as to centrally overlie the die cavity 250, and with movement of the ram 230 being along an imaginary axis that is designated by the numeral 260 and that extends vertically an centrally into the die cavity 250. The ram 230 has a circular end member 232 with a diameter that is selected to be about two thirds of the diameter of a cylindrical drum 10 that is to be inserted into the die cavity 250 for reconfiguration by the apparatus 200. If the container 10 is a 24 inch diameter drum (as has been described previously), the diameter of the end member 232 of the ram 230 preferably is within the range of about 17 to 18 inches—whereby the ram 230 serves to act on the central portion 20b of the end wall 20 of the container 10 so as to permit peripheral portions 20a of the end wall 20 to be folded axially so as to define an extension of the side wall 12 of the container 10 as the container 10 is reconfigured to form the container 110.

The die 240 has a generally cylindrical side wall 242 that extends upwardly, concentrically about the axis 260 from a bottom wall 244. Inwardly extending ribs 246 are provided on the interior of the side wall 242, with the ribs 246 being of tapered, smoothly rounded configuration so as to enable the material of the container 10 to slide along the ribs 246 as the container 10 is being reconfigured to assume the shape of a fully reconfigured container 110. Preferably, tapered formations 248 also are provided adjacent the bottom wall 244 to assist the ribs 246 in properly inwardly folding, bending and reconfiguring the peripheral portions 20a of the bottom wall 20 to form a smooth transition between the bottom 120 and the fluted side wall 112.

Figure 12:
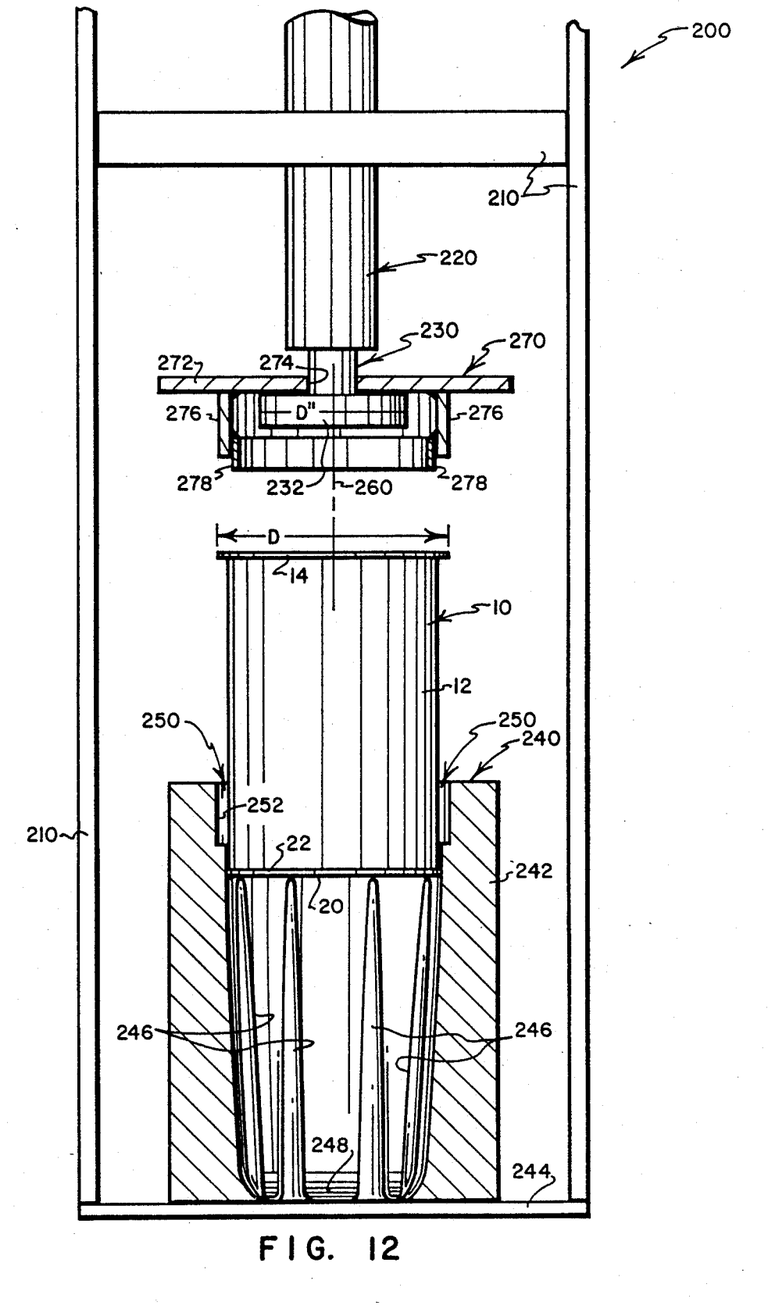
FIG. 12 is a side elevational view similar to FIG. 10 but with portions thereof broken away and shown in cross section, and with a container of the type that is depicted in FIG. 1 being shown as it is introduced into the die of the apparatus to initiate its reconfiguration.

Referring to FIG. 12, a follower assembly 270 is movably supported on the ram 230. The follower 270 includes a transversely extending base member 272 that has a hole 274 formed centrally therethrough to receive the ram 230 in a slip fit that enables the base member 272 to move axially along the ram 230 under the influence of gravity. An outer ring structure 276 depends from the base member 272 and is configured to be received within upper portions 252 of the die cavity 250 in a slip fit. An inner ring structure 278 depends from the interior of the outer ring member 276 and is sized to extend into the opening 16 of a container 10 in a slip fit so as to reinforce the rim 14 of a container 10 during the reconfiguration of the container 10 by the apparatus 200.

Referring still to FIG. 12, the de cavity 250 has an upper portion 252 of substantially uniform diameter that is configured to receive the outer diameter of the outer ring structure 276 in a slip fit. The remainder of the die cavity 250 is of a relatively smaller diameter that is selected to permit the seam 22 of the container 10 to pass therethrough in a slip fit—except for the provision of the gently rounded, tapered ribs 246 that project radially into the die cavity at locations spaced substantially equally about the circumference of the die cavity 250.

Figures 13, 14:
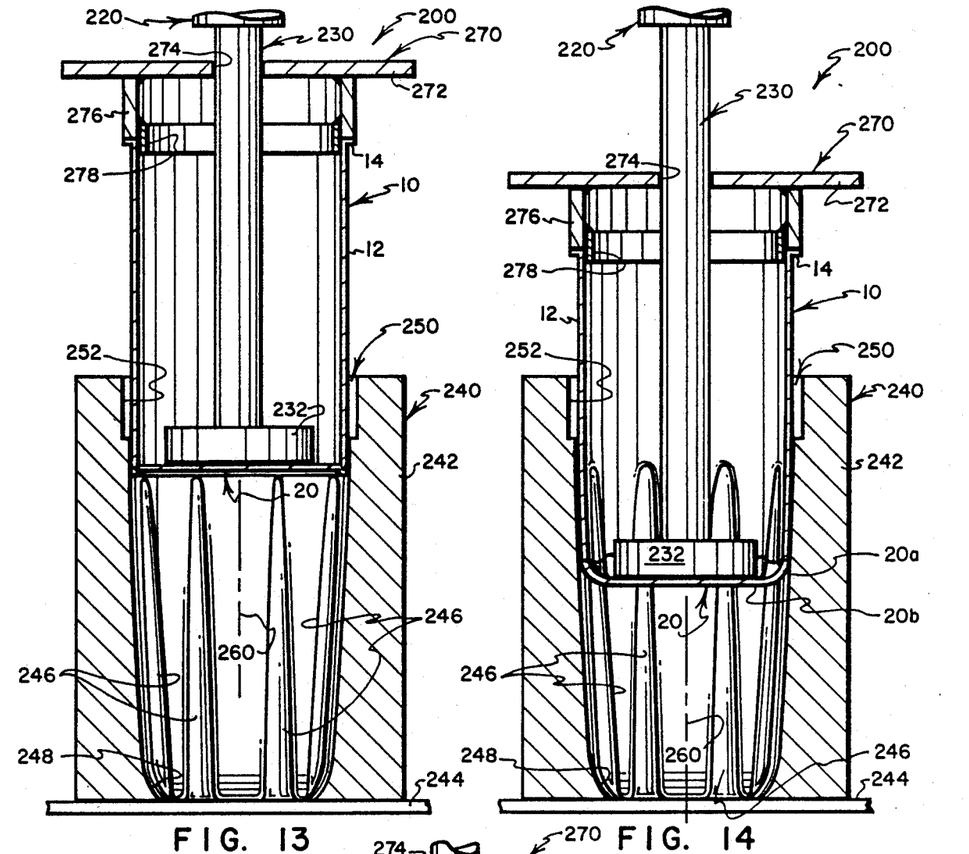
FIGS. 13 through 17 are side elevational views that are similar to FIG. 12 except that selected portions of the apparatus are broken away, with this series of views depicting stages in the process by which a container of the type that is shown in FIG. 1 is reconfigured to form a container of the type that is shown in FIG. 3; and, FIG. 18 is a sectional view that shows one option that can be employed to remove a reconfigured container from the die of the apparatus.

In FIG. 12, the container 10 is shown loaded into the upper portion 252 of the die cavity 250, and has slipped downwardly into the die cavity 250 under the influence of gravity to a position wherein the seam 22 engages the upper end regions of the ribs 246. In FIG. 13, the ram 230 is shown extended to depend into the container 10 with the enlarged end region 232 of the ram being brought into engagement with the interior surface of the central portion 20b of the bottom wall 20. Also illustrated in FIG. 13 is the fact that, as the ram 230 has been lowered into the container 10, the follower 270 has dropped with the ram 230 under the influence of gravity to a position wherein the inner ring member 278 has extended inside the container opening 16 to reinforce the side wall 12 in the vicinity of the rim 14, with the outer ring member 276 resting in engagement with the top of the rim 14. The follower 270 will remain in engagement with the upper end region of the container 10 in the manner that is depicted in FIG. 13 throughout the process of reconfiguring the container, as will be apparent from viewing the sequence of steps that is illustrated in FIGS. 14 through 16.

Figure 15:
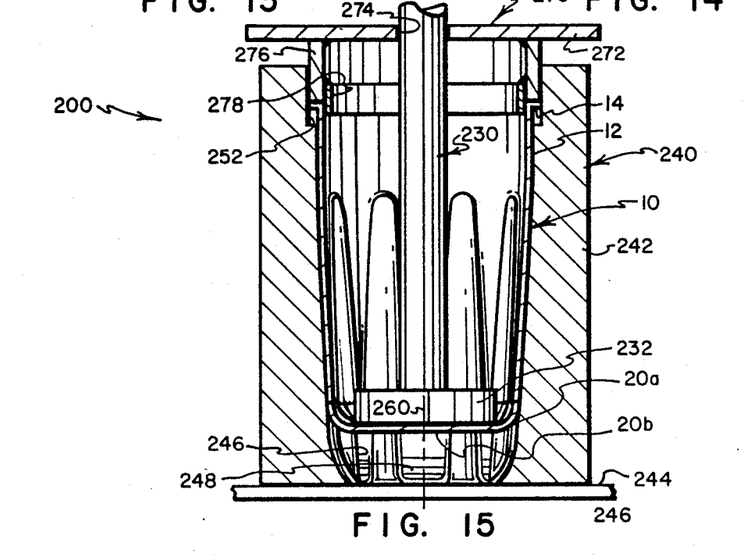
Figure 16:
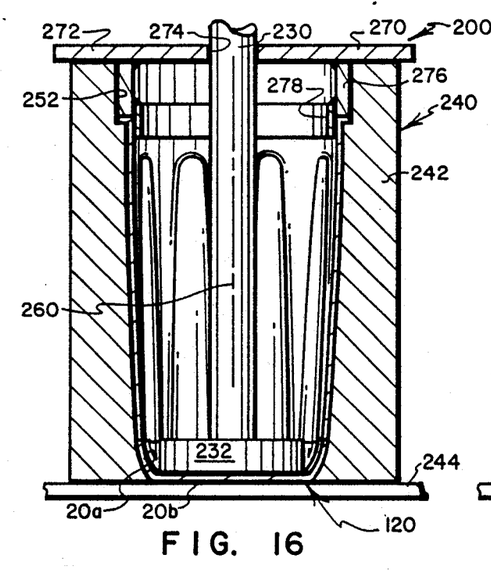

Referring to FIGS. 14 through 16, as the ram 230 is progressively extended to drive the bottom wall 20 of the container 10 into the die cavity 250 (and eventually into engagement with the bottom wall 244 of the cavity 250), the flutes 246 are formed gradually and progressively, the bottom wall 20 of the container is reconfigured to elongate the container 10, and the rim 14 is held in its desired shape and configuration by upper portions of the die 240 which cooperate with the follower 270 to confine the upper end region of the container 10 from distorting.

Figure 17:
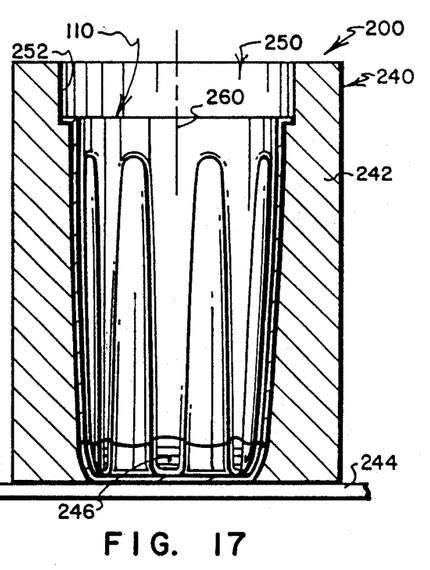
Figure 18:
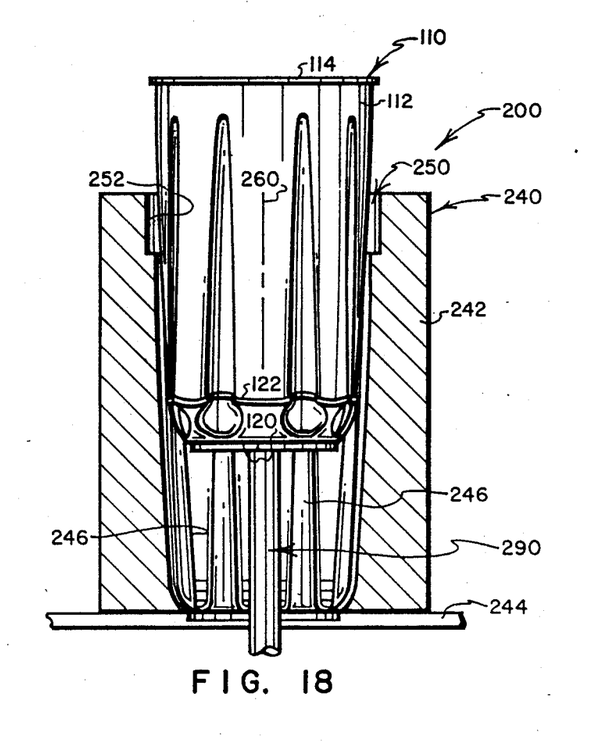

Referring to FIG. 17, when the ram 230 is withdrawn, the follower 270 moves upwardly with it, leaving the newly formed container 110 residing within the mold cavity 250, whereupon the reconfigured container 110 is removed from the die 240. A preferred (but optional) way in which the reconfigured container 110 can be removed from the die 240 is illustrated in FIG. 18, wherein a portion of the bottom wall 244 is defined by an extractor ram 290 that is extended to release a newly reconfigured container 110 from within the confines of the die 240.

To summarize, the pressing of one of the containers into the die 240 is effected by means of the ram 230 which has an end region 232 that engages the central portion 20b of the bottom wall 20, with the central portion 232 of the ram 230 having a diameter that is about two-thirds of the diameter of the container. As the ram 230 progressively forces the container 10 into the die 240, the ribs 242 of the die 240 form progressively deeper, progressively longer flutes 142 that extend along the side wall of the container 10 that is being reconfigured. The flutes 142 extend across the seam 22 that is provided between the side wall 12 and the bottom wall portions 20a, and causes the formation of a complexly configured seam 122, but without rupturing the seam or otherwise causing a loss in structural or functional integrity.

As the ram 230 progressively forces the container 10 into the die 240, the compressive forces that are exerted on peripheral bottom portions 20a of the container 10 by the ribs 242, taken together with the axial forces that are exerted on central portions 20b of the bottom wall 20 by the ram 230, cause the peripheral portions 20a of the bottom wall 20 to fold gently, progressively, radially inwardly and to extend axially so as to thereby permit the central portions 20b of the bottom wall 20 to travel axially in the direction of movement of the ram 230 relative to the side wall 12.

As the container 10 is press-formed so as to effect its reconfiguration, the inward folding of portions of the side wall 12 to form the flutes 142 will cause some diminishing of the fluid-carrying volume of the container. However, the axial extension of central portions 20b of the bottom wall 20 (i.e., the elongation of the container 10 during its reconfiguration) causes some increase in the fluid-carrying volume of the container—with the result that, in final form, the reconfigured container 110 need not appreciably differ in fluid-carrying volume from the volume of the original container 10.

As will be apparent from the foregoing description, the system of the present invention enables nestable containers to be formed economically as by reconfiguring conventional cylindrical containers to add features that include bottom wall elongation and side wall flutes. The deep draw method by which these features are added provides an unexpected result, namely a demonstration of the fact that even industrial drums having rolled bottom wall seams can be successfully reconfigured to provide container nestability and the advantages that flow therefrom. The system of the present invention is versatile in its character, and widespread in its applicability, incorporating novel and improved features that are not taught or suggested by the prior art.

Although the invention has been described in its preferred form with a certain degree of particularity, it will be understood that the present disclosure of the preferred form has been made only by way of example, and that numerous changes in the details of construction and the combination and arrangements of parts and the like may be resorted to without departing from the spirit and scope of the invention as hereinafter claimed. It is intended that the patent shall cover, by suitable expression in the appended claims, whatever features of patentable novelty exist in the invention disclosed.

What is claimed is:

1. A nestable container that is formed as a product of a process that includes the steps of:
   (a) providing an open-top container that is formed from metal and that has upstanding, generally cylindrical side wall means including an uninterrupted band of metal sheet stock arranged in a ring-like band for defining a side wall that extends with substantially uniform diameter between spaced, opposed ends thereof, with the side wall including rim formation means defined adjacent one of the ends thereof for surrounding an upwardly facing opening that is of substantially the same diameter as is the uniform diameter of the side wall, and that has a circular bottom wall formed from metal sheet stock that is connected by a circumferentially extending seam to the other of the opposed ends for closing said other end and to cooperate with the side wall to form a generally cylindrical, open-top container having a length that extends along an imaginary axis that extends centrally through the container coaxially with the side wall means, and having a capability to receive and contain a quantity of fluid as by filling the open-top container to its rim formation; and,
   (b) reconfiguring the generally cylindrical, open-top container to provide a container that has (1) side portions that are substantially unchanged in configuration in the vicinity of the rim formation so as to render the upwardly facing opening unchanged in size and dimension, (2) side portions that are tapered along at least a majority of the said length so as to effectively diminish the diameter of the reconfigured container as the side wall approaches the seam that connects the side wall to the bottom wall, (3) a plurality of tapered flute formations extending along the side portions from a position spaced from the rim formation and being defined by a plurality of smoothly curved surface features that are introduced into the side wall to give the side wall a tapered, fluted configuration that narrows in diameter as it approaches the bottom wall, (4) with the flute formations extending across the seam that connects the side wall to the bottom wall, (5) with the bottom wall having central portions thereof moved axially from the vicinity of the seam in a direction away from the rim formation so as to effectively elongate the container and to define a circular container bottom having an outer diameter that is smaller than is the diameter of the side wall in the vicinity of the rim, (6) with such peripheral portions of the bottom wall as extend between the seam and the container bottom serving to provide complexly configured transition surfaces that connect the bottom with the fluted side wall, are located in the vicinity of the seam being reconfigured to provide smooth transitions therebetween, and (7) with the integrity of the seam being preserved such that the resulting reconfigured container retains its fluid-carrying capability.

2. The nestable container of claim 1 wherein the flute formation are arranged so as to extend along the majority of the length of the side of the reconfigured container.

3. The nestable container of claim 2 wherein the flute formations are of substantially identical configuration as compared one with another;

4. The nestable container of claim 3 wherein the flute formations are provided at substantially equally spaced locations about the circumference of the side wall of the reconfigured container.

5. The nestable container of claim 4 wherein there are an even number of the flute formations, and the flute formations are arranged about the circumference of the side wall in opposed pairs, with the flute formations of each of the opposed pairs being on opposite sides of the side wall.

6. The nestable container of claim 5 wherein the flute formations are eight in number.

7. The nestable container of claim 6 wherein the complexly configured transition surfaces that extend between the seam and the container bottom are smoothly curved in character and define bottom ends of the flute formations at locations in close proximity to the outer diameter of the bottom of the reconfigured container.

8. The nestable container of claim 1 wherein the outer diameter of the bottom of the reconfigured container is about two-thirds of the substantially uniform diameter of the side portions in the vicinity of the rim formation.

9. The nestable container of claim 1 wherein the side and bottom of the reconfigured container are shaped so as to permit four of the reconfigured containers that are substantially identical one with another to be nested in an upwardly extending nest, with portions of three of the four containers extending into at least one of the underlying containers in the nest, and with the height of the nest of four containers not exceeding the equivalent height of two of said generally cylindrical open-top containers stacked one atop another.

10. A nestable, open-top container, comprising:
   (a) side wall means including an uninterrupted generally cylindrical, ring-like band of metal that extends about a central axis between an upper end region and a lower end region to define;

(i) upper end formation means including a portion of the side wall means that defines a rim formation that surrounds an upwardly facing, circular opening for introducing contents into and for removing contents from the container, with the upper end formation means also defining a side wall portion that depends coaxially along the central axis from the rim formation and is of substantially constant diameter;

(ii) fluted, tapered wall means including a portion of the side wall means that joins contiguously with the upper end formation means and depends along the central axis, with the fluted, tapered wall means having been formed as by reconfiguring the side wall means starting with the ring-like band having a substantially uniform diameter that extends between the upper end region and the lower end region;

(b) bottom wall means including an uninterrupted piece of metal that has a central portion that defines a container bottom that extends transverse to and is intersected by the central axis at a location along the axis spaced beneath the fluted, tapered wall means, and that has peripheral portions that that join contiguously with the central portion for providing a smooth transition between the container bottom and the fluted, tapered wall means, with the bottom wall means having been formed during said reconfiguring of the side wall means as by starting with said piece of metal being generally circular and being circumferentially connected as by a seam to the bottom end region of the side wall means; and, (c) the fluted, tapered wall means being configured to cooperate with the peripheral portions to provide the container with an upstanding side wall that is tapered along at least a majority of its length so as to effectively diminish the diameter of the container as the side wall approaches the container bottom, with the fluted, tapered wall means including a plurality of tapered flute formations extending substantially the full length therealong, with the flute formations being of substantially identical configuration as compared one with another, with the flute formations being provided at substantially equally spaced locations about the circumference of the container bottom, with there being an even number of the flute formations whereby the flute formations are arranged in opposed pairs so as to extend along opposite site sides of the side wall, across the seam that is formed between the bottom end region of the side wall and the circumference of the peripheral portions, and with the integrity of the seam being preserved such that the resulting nestable container maintains a fluid-carrying capability.

11. The nestable container of claim 10 wherein the flute formations are eight in number.

12. The nestable container of claim 10 wherein the outer diameter of the container bottom is about two-thirds of the substantially constant diameter of the upper end formation means.

13. The nestable container of claim 10 wherein the side and bottom of the nestable container are shaped so as to permit four of the nestable containers that are substantially identical one with another to be nested in an upwardly extending nest, with portions of three of the four containers extending into at least one of the underlying containers in the nest, and with the height of the nest of four containers not exceeding twice the height of one of the nestable containers.

14. A method of forming a nestable container, comprising the steps of:

(a) providing an open-top container that is formed from metal and that has upstanding, generally cylindrical side wall means including an uninterrupted band of metal sheet stock arranged in a ring-like band for defining a side wall that extends with substantially uniform diameter between spaced, opposed ends thereof, with the side wall including rim formation means defined adjacent one of the ends thereof for surrounding an upwardly facing opening that is of substantially the same diameter as is the uniform diameter of the side wall, and that has a circular bottom wall formed from metal sheet stock that is connected by a circumferentially extending seam to the other of the opposed ends for closing said other end and to cooperate with the side wall to form a generally cylindrical, open-top container having a length that extends along an imaginary axis that extends centrally through the container coaxially with the side wall means, and having a capability to receive and contain a quantity of fluid as by filling the open-top container to its rim formation; and, (b) reconfiguring the generally cylindrical, open-top container to provide a container that has (1) side portions that are substantially unchanged in configuration in the vicinity of the rim formation so as to render the upwardly facing opening unchanged in size and dimension, (2) side portions that are tapered along at least a majority of the said length so as to effectively diminish the diameter of the reconfigured container as the side wall approaches the seam that connects the side wall to the bottom wall, (3) a plurality of tapered flute formations extending along the side portions from a position spaced from the rim formation and being defined by a plurality of smoothly curved surface features that are introduced into the side wall to give the side wall a tapered, fluted configuration that narrows in diameter as it approaches the bottom wall (4) with the flute formations extending across the seam that connects the side wall to the bottom wall, (5) with the bottom wall having central portions thereof moved axially from the vicinity of the seam in a direction away from the rim formation so as to effectively elongate the container and to define a circular container bottom having an outer diameter that is smaller than is the diameter of the side wall in the vicinity of the rim, (6) with such peripheral portions of the bottom wall as extend between the seam and the container bottom serving to provide complexly configured transition surfaces that connect the bottom with the fluted side wall, are located in the vicinity of the seam being reconfigured to provide smooth transitions therebetween, and (7) with the integrity of the seam being preserved such that the resulting reconfigured container retains its fluid-carrying capability.

15. A nestable container formed in accordance with the method of claim 14.

16. The method of claim 14 wherein the step of reconfiguring the open-top container includes arranging the flute formations so as to extend along the majority of the length of the side of the reconfigured container.

17. A nestable container formed in accordance with the method of claim 16.

18. The method of claim 16 wherein the step of reconfiguring the open-top container includes forming the flute formations so that they have a substantially identical configuration as compared one with another.

19. A nestable container formed in accordance with the method of claim 18.

20. The method of claim 18 wherein the step of reconfiguring the open-top container includes forming the flute formations so that they are provided at substantially equally spaced locations about the circumference of the side wall of the reconfigured container.

21. A nestable container formed in accordance with the method of claim 20.

22. The method of claim 20 wherein the step of reconfiguring the open-top container includes forming the flute formations so that there are an even number of the flute formations, and the flute formations are arranged about the circumference of the side wall in opposed pairs, with the flute formations of each of the opposed pairs being on opposite sides of the side wall.

23. A nestable container formed in accordance with the method of claim 22.

24. The method of claim 22 wherein the step of reconfiguring the open-top container includes forming the flute formations so that they are eight in number.

25. A nestable container formed in accordance with the method of claim 24.

26. A method for reconfiguring a generally cylindrical open-top container that is formed from metal and is of the type including a generally cylindrical side wall that defines a container of substantially uniform diameter extending between an open end of the container that is defined by one end region of the side wall, and a closed end that is defined by a generally circular bottom wall that is connected to an opposed end region of the side wall along a seam that extends substantially circumferentially about the bottom wall, to provide a container that is tapered so as to diminish in diameter along the length of its side wall in a direction extending away from the open end, with a plurality of circumferentially spaced, inwardly tapering flute formations being provided along at least a majority of the length of the side wall and extending across the juncture of the side wall with the bottom wall, and with central portions of the bottom wall being moved axially away from the juncture in said direction so as to elongate and taper the container during reconfiguration and to render the reconfigured container nestable within portions of the open end region of another such container, comprising the steps of:
(a) providing a generally cylindrical container of the type including a generally cylindrical side wall that defines a container of substantially uniform diameter extending between an open end of the container that is defined by one end region of the side wall, and a closed end that is defined by a generally circular bottom wall that is connected to an opposed end region of the side wall along a seam that extends;
(b) providing a die having a generally cylindrical cavity with an open end for receiving the closed end region of the generally cylindrical container, and having a plurality of projections that taper inwardly for forming tapering flute formations along the side wall and extending onto the bottom wall of the container;
(c) providing a ram for inserting into the generally cylindrical container to engage central portions of the inside surface of the bottom wall to force the container into the die cavity; and,
(d) reconfiguring the container by positioning the container for movement into the die cavity, and by forcing the ram into contact with the interior surface of central portions of the bottom wall to force the container into the die cavity to form a container that is tapered so as to diminish in diameter along the length of its side wall in a direction extending away from the open end, with a plurality of circumferentially spaced, inwardly tapering flute formations being provided along at least a majority of the length of the side wall and extending across the juncture of the side wall with the bottom wall, and with central portions of the bottom wall being moved axially away from the juncture in said direction so as to elongate and taper the container during reconfiguration and to render the reconfigured container nestable within portions of the open end region of another such container.

27. A nestable container formed in accordance with the method of claim 26.

28. An apparatus for reconfiguring a generally cylindrical container of the type including a generally cylindrical side wall that defines a container of substantially uniform diameter extending between an open end of the container that is defined by one end region of the side wall, and a closed end that is defined by a generally circular bottom wall that is connected to an opposed end region of the side wall along a seam that extends substantially circumferentially about the bottom wall, to provide a container that is tapered so as to narrow in diameter along the length of its side wall with a plurality of circumferentially spaced, inwardly tapering ribs extending along at least a majority of the length of the side wall and extending across the juncture of the side wall with the bottom wall and extending to portions of the bottom wall so as to render the reconfigured container nestable container, comprising:
(a) die means having a generally cylindrical cavity with an open end for receiving the closed end region of the generally cylindrical container, and having a plurality of projections that taper inwardly for forming tapering ribs in the side wall and bottom wall of the container;
(b) ram means for inserting into the generally cylindrical container to engage portions of the inside surface of the bottom wall to force the container into the die cavity for reconfiguring the container by positioning the container for movement into the die cavity, and by forcing the ram into contact with interior surface portions of the bottom wall to force the container into the die cavity to form a container that is tapered so as to narrow in diameter along the length of its side wall with a plurality of circumferentially spaced, inwardly tapering ribs extending along at least a majority of the length of the side wall and extending across the juncture of the side wall with the bottom wall and extending to portions of the bottom wall so as to render the reconfigured container nestable within portions of the open end region of another such container.

29. The apparatus of claim 28 additionally including retainer means for engaging the generally cylindrical side wall of the container in the vicinity of the open end region thereof to maintain dimensional and shape stability thereof during the reconfiguration process.

30. The apparatus of claim 29 wherein the retainer is connected to the ram and is movable relative thereto.

31. The apparatus of claim 28 wherein the circumferentially spaced, inwardly tapering ribs are arranged in opposed pairs on opposite sides of the die, are substantially equally spaced about the interior of the die, and are of substantially identical configuration as compared one with another.

32. The apparatus of claim 28 additionally including means connected to the die for engaging a reconfigured container that has been formed within the die for removing the reconfigured container from the die.

33. A method of loading a maximum number of empty, open-top, metal containers, into a given space, wherein each of the containers has substantially the same generally cylindrical shape and size, comprising the steps of:

(a) providing a plurality of open-top containers that each are formed from metal, and that each has upstanding, generally cylindrical side wall means including an uninterrupted band of metal sheet stock arranged in a ring-like band for defining a side wall that extends with substantially uniform diameter between spaced, opposed ends thereof, with the side wall including rim formation means defined adjacent one of the ends thereof for surrounding an upwardly facing opening that is of substantially the same diameter as is the uniform diameter of the side wall, and that has a circular bottom wall formed from metal sheet stock that is connected by a circumferentially extending seam to the other of the opposed ends for closing said other end and to cooperate with the side wall to form a generally cylindrical, open-top container having a length that extends along an imaginary axis that extends centrally through the container coaxially with the side wall means, and having a capability to receive and contain a quantity of fluid as by filling the open-top container to its rim formation;

(b) reconfiguring the generally cylindrical, open-top containers to provide containers that each have (1) side portions that are substantially unchanged in configuration in the vicinity of the rim formation so as to render the upwardly facing opening unchanged in size and dimension, (2) side portions that are tapered along at least a majority of the said length so as to effectively diminish the diameter of the reconfigured container as the side wall approaches the seam that connects the side wall to the bottom wall, (3) a plurality of tapered flute formations extending along the side portions from a position spaced from the rim formation and being defined by a plurality of smoothly curved surface features that are introduced into the side wall to give the side wall a tapered, fluted configuration that narrows in diameter as it approaches the bottom wall, (4) with the flute formation extending across the seam that connects the side wall to the bottom wall, (5) with the bottom wall having central portions thereof moved axially from the vicinity of the seam in a direction away from the rim formation so as to effectively elongate the container and to define a circular container bottom having an outer diameter that is smaller than is the diameter of the side wall in the vicinity of the rim, (6) with such peripheral portions of the bottom wall as extend between the seam and the container bottom serving to provide complexly configured transition surfaces that connect the bottom with the fluted side wall, are located in the vicinity of the seam being reconfigured to provide smooth transitions therebetween, and (7) with the integrity of the seam being preserved such that the resulting reconfigured container retains its fluid-carrying capability; and, (c) nesting the reconfigured containers so as to extend portions of selected ones of the containers into adjacent containers to form at least one nest of the reconfigured containers, with as many of the reconfigured containers as possible being incorporated into the at least one nest, and with a minimal number of such nests being formed so as to enable the containers to be loaded into the given space while minimizing the amount of space that is consumed by the empty, reconfigured containers.

* * * * *